US011514196B2

(12) United States Patent
Grobelny et al.

(10) Patent No.: US 11,514,196 B2
(45) Date of Patent: Nov. 29, 2022

(54) METHOD AND APPARATUS FOR A MODULAR DIGITAL CHASSIS LOCK ASSEMBLY IN AN INFORMATION HANDLING SYSTEM

(71) Applicant: DELL PRODUCTS, LP, Round Rock, TX (US)

(72) Inventors: Nicholas D. Grobelny, Austin, TX (US); Michael David, Austin, TX (US); Christian L. Critz, Liberty Hill, TX (US)

(73) Assignee: Dell Products L.P., Round Rock, TX (US)

( * ) Notice: Subject to any disclaimer, the term of this patent is extended or adjusted under 35 U.S.C. 154(b) by 777 days.

(21) Appl. No.: 16/540,680

(22) Filed: Aug. 14, 2019

(65) Prior Publication Data
US 2021/0049310 A1 Feb. 18, 2021

(51) Int. Cl.
*G06F 21/86* (2013.01)
*G06F 21/31* (2013.01)
*H04L 9/08* (2006.01)
*E05B 73/00* (2006.01)
*G07C 9/00* (2020.01)

(52) U.S. Cl.
CPC .......... *G06F 21/86* (2013.01); *E05B 73/0082* (2013.01); *G06F 21/31* (2013.01); *G07C 9/00174* (2013.01); *H04L 9/0891* (2013.01); *H04L 9/0894* (2013.01); *E05B 2073/0088* (2013.01)

(58) Field of Classification Search
CPC ...... G06F 21/86; G06F 21/31; E05B 73/0082; E05B 2073/0088; G07C 9/00174; H04L 9/0891; H04L 9/0894
See application file for complete search history.

(56) References Cited

U.S. PATENT DOCUMENTS

| | | | | |
|---|---|---|---|---|
| 6,324,928 B1* | 12/2001 | Hughes | ................... | F16H 63/34 74/335 |
| 8,047,582 B1* | 11/2011 | Rodgers | ..................... | E05C 3/24 292/201 |
| 9,912,103 B2* | 3/2018 | Morrison | .............. | H01R 13/633 |
| 10,228,731 B2* | 3/2019 | Montero | ............... | G06F 1/1677 |
| 2012/0203179 A1* | 8/2012 | Hills | ................. | A61M 5/16854 604/151 |
| 2017/0051530 A1* | 2/2017 | Colman | ................... | E05B 17/22 |
| 2020/0002972 A1* | 1/2020 | Basavaraju | ......... | E05B 27/0092 |

\* cited by examiner

*Primary Examiner* — Thomas D Alunkal
(74) *Attorney, Agent, or Firm* — Larson Newman, LLP

(57) ABSTRACT

A lock for an information handling system includes a sensor configured to detect removal of an element from a chassis prior to verification of a user credential, and a plunger that engages the chassis at a first position. A security controller verifies the user credential, and causes the muscle wire to move the plunger from the first position to a second position in response to the verified user credential.

20 Claims, 6 Drawing Sheets

METHOD AND APPARATUS FOR A MODULAR DIGITAL CHASSIS LOCK ASSEMBLY IN AN INFORMATION HANDLING SYSTEM

FIELD OF THE DISCLOSURE

This disclosure generally relates to information handling systems, and more particularly relates to a modular digital chassis lock assembly in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A lock for an information handling system may include a sensor configured to detect removal of an element from a chassis prior to verification of a user credential, and a plunger that engages the chassis at a first position. A security controller may verify the user credential, and cause the muscle wire to move the plunger from the first position to a second position in response to the verified user credential.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
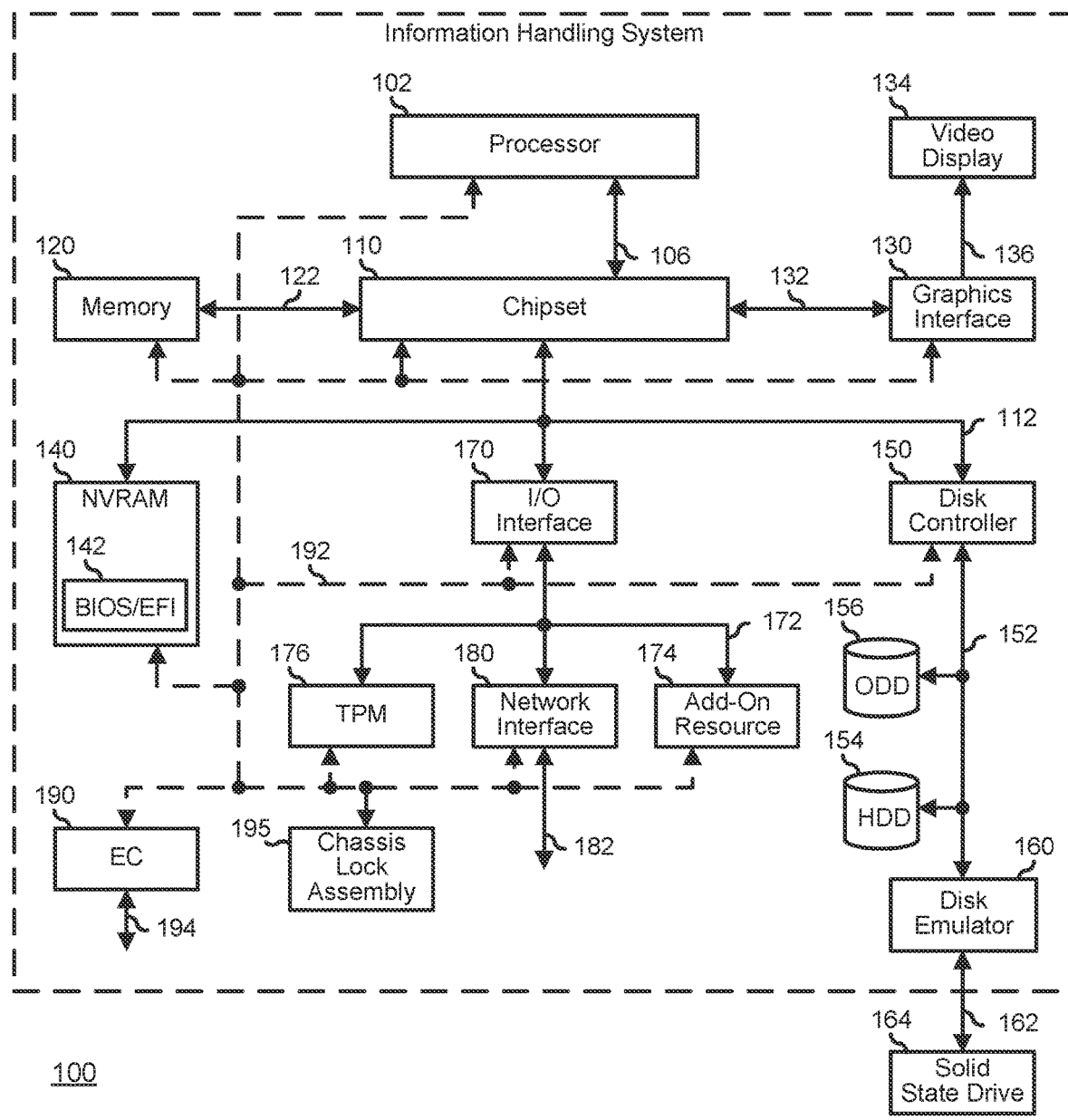
FIG. 1 is a block diagram of an information handling system, according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, an embedded controller (EC) 190, and a chassis lock assembly 195. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processor 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

EC 190 represents one or more processing devices, such as a dedicated Baseboard Management Controller (BMC) System-on-a-Chip (SoC) device, one or more associated memory devices, one or more network interface devices, and the like, that operate together to provide the management environment for information handling system 100. In particular, EC 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. EC 190 can use a network interface 194 as a network connection to an external management system, and the EC can report status information for information handling system 100, receive BIOS/UEFI or system firmware updates, or other control information for managing and controlling the operation of the information handling system. EC 190 can operate off of a separate power plane from the components of the host environment so that the EC receives power to manage information handling system 100 when the information handling system is otherwise shut down. An example of the EC 190 includes a commercially available BMC product that operates in accordance with an Intelligent Platform Management Initiative (IPMI) specification, such as a Integrated Dell Remote Access Controller (iDRAC), or the like.

Chassis lock assembly 195 may be hardware circuitry that provides tamper resistance to removable devices or elements of the information handling system. The chassis lock assembly 195 may be integrated into the detachable device, and the chassis lock assembly can be connected to the EC 190 and/or the BIOS 142 through the management interface 192. To improve the provided tamper resistance, the chassis lock assembly 195 preferably combines a physical structure and the use of digital authorization.

Figure 2:
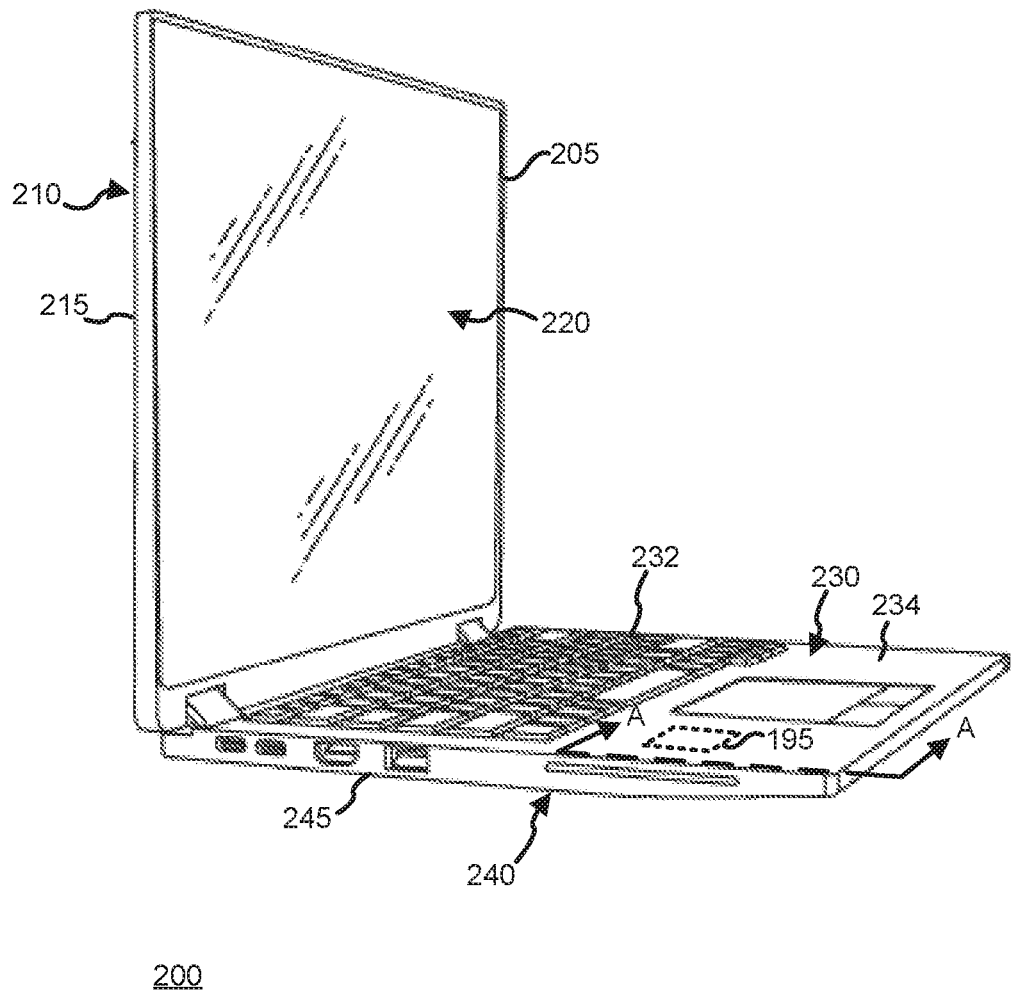
FIG. 2 is a perspective view of a portable information handling system that utilizes a modular digital chassis lock assembly that couples an information handling system element to a chassis, according to an embodiment of the present disclosure.

FIG. 2 shows an information handling system 200 such as a portable computer. The portable computer includes a first major surface 210, a second major surface 220, a third major surface 230, and a fourth major surface 240. The first major surface 210 may represent an A-cover section that includes an outer chassis 215 of a lid 205. The second major surface 220 may represent a B-cover section that includes a display surface, which can be attached to the outer chassis 215. The third major surface 230 may represent a C-cover section that includes a keyboard 232 with a keyboard chassis 234. The fourth major surface 240 may represent a D-cover section including a bottom chassis 245 that is in physical communication with the keyboard chassis 234. In an embodiment, the removable element such as a motherboard may be mounted in the bottom chassis 245 using fasteners such as screws or clips. In this embodiment, the chassis lock assembly 195 may be integrated into the motherboard, and the chassis lock assembly can be used to couple the motherboard to the bottom chassis 245. The motherboard may be removed only after removal of the screws or clips, and the disengagement by the chassis lock assembly 195 from the bottom chassis 245. Although the chassis lock assembly 195 can be integrated into the motherboard, the chassis lock assembly includes a modular structure that may be taken out from the motherboard without affecting the remainder of the information handling system.

Figure 3:
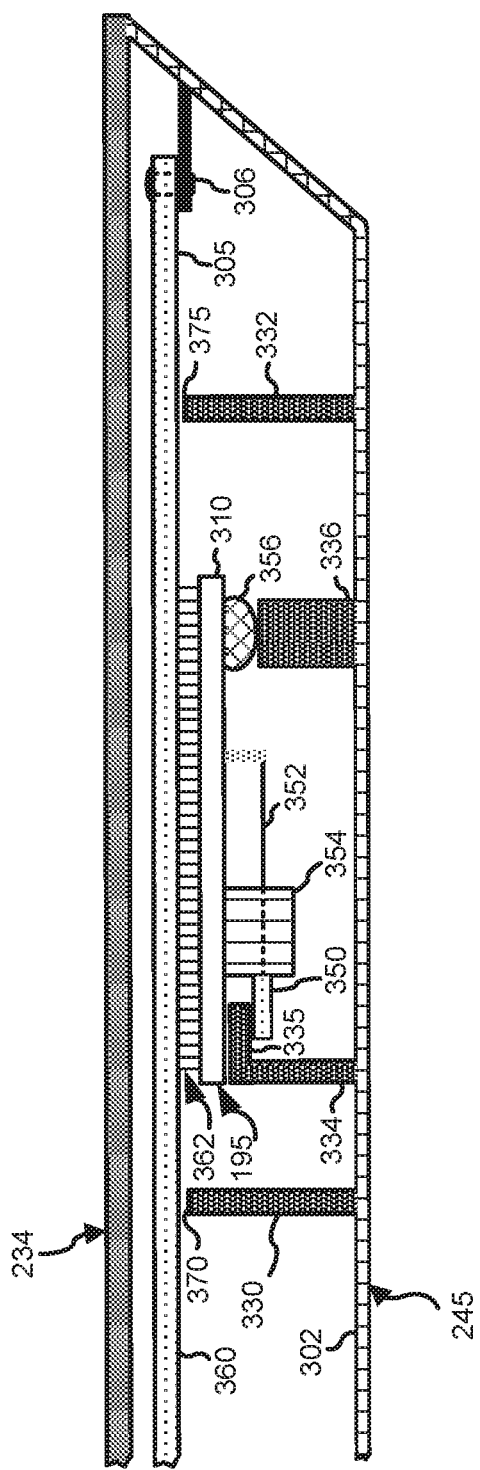
FIG. 3 is a cross-sectional view taken along a line A-A in FIG. 2 of a portion of the information handling system including the chassis lock assembly, according to an embodiment of the present disclosure.

FIG. 3 shows the bottom chassis 245 including an inner surface 302, the keyboard chassis 234, and a motherboard 305 that can be mounted in the bottom chassis using a fastener 306 such as a screw or clip. The bottom chassis 245 further includes a first guard post 330, a second guard post 332, a hook 334 having a short side 335, and a sensor reference post 336. The chassis lock assembly 195 includes a plunger 350, a muscle wire 352, a plunger housing 354, a sensor 356, and a security controller 310 that may be attached to a bottom surface 360 of the motherboard 305 through connectors 362. After unlatching the chassis lock assembly 195 from the hook 334, removal of the fastener 306, and powering down the information handling system, the motherboard 305 can be separated from the bottom chassis 245.

The first guard post 330 may include a structure that blocks unauthorized unlatching of the plunger 350 from the hook 334. For example, the first guard post 330 may include a rectangular structure having a length that is formed perpendicular to a plane of the inner surface 302. In this example, a top surface 370 that includes one end of the rectangular structure length may be positioned closer to the bottom surface 360 of the motherboard 305. Furthermore, the rectangular structure may be positioned near a first major surface of the security controller 310 to impede prying of the chassis lock assembly 195 through the small gap between the top surface 370 and the bottom surface 360.

The second guard post 332 similarly may include a structure that blocks unauthorized unlatching of the plunger 350 at a second major surface of the security controller 310. For example, the second guard post 332 includes a rectangular structure having a length that is disposed perpendicular to the inner surface 302. In this position, a top surface 375 that includes one end of the rectangular structure can be disposed near the bottom surface 360 of the motherboard 305. In this example, the second guard post 332 is positioned near the second major surface of the security controller 310 so that prying of the muscle wire 352 at the second major surface without activating the sensor 356 can be very difficult. The second major surface is located at an opposite end of the first major surface where the first guard post 330 is located. In other embodiment, a single guard post having a structure that surrounds the chassis lock assembly 195 and the hook 334 can be used. In this other embodiment, a small clearance can be formed between the top surface of the single guard post and the bottom surface 360 of the motherboard 305 to prevent physical tampering of the chassis lock assembly 195.

The hook 334 includes a structure that secures the plunger 350 when the plunger is extended towards the short side 335 of the hook at a first position. The hook 334 may include a vertically flipped "L" shape structure with the short side 335 positioned in parallel with the inner surface 302. At the first position, the plunger 350 is extended towards the location of the hook 334 and adjacent to the short side 335 so that the short side is positioned in between the bottom surface 360 of the motherboard 305 and the plunger. When the plunger 350 is disposed adjacent to the short side 335, the hook 334 may prevent physical removal of the chassis lock assembly 195 from the bottom chassis 245 without activating the sensor 356. To disengage from the hook 334, the plunger 350 is placed at a second position and the sensor 356 is disabled by the security controller 310. The second position includes a location of the plunger 350 that is retracted towards the plunger housing 354 and thus disengaged from the short side 335 of the hook 334. That is, the plunger 350 does not engage the hook 334 when the chassis lock assembly 195 is lifted upward towards the keyboard chassis 234, or moved sideways from the bottom chassis 245.

The plunger housing 354 includes an enclosure that holds the plunger 350 inside of the enclosure at the second position, or aligns the plunger to engage the hook 334 at the first position. The enclosure, for example, includes a channel that secures the plunger 354 when the plunger moves from the second position to the first position, or vice versa. The plunger housing 354 may be disposed near an edge of the short side 335 so that the plunger 350 may be able to latch with the hook 334 at the first position, and to unlatch from the hook at the second position. At the second position, the plunger 350 is retracted within the plunger housing 354 and the motherboard 305 may be removed from the bottom chassis 245 after the disabling of the sensor 356.

The muscle wire 352 may be made of material that shrinks or stretches in response to an application of an electrical signal. The muscle wire 352 is coupled to the plunger 350 to move the plunger from the first position to the second position, or vice versa. That is, the muscle wire 352 can be used to extend the plunger 350 to the first position, or retract the plunger to the second position. For example, the muscle wire 352 may bias the plunger 350 to the first position when no electrical signal is applied. In this example, the muscle wire 352 returns to its original length when no electrical signal is present. However when the electrical signal is applied, the muscle wire 352 shrinks and retracts the plunger 350 to the second position. In another example, a first muscle wire is used to extend the plunger to the first position, while a separate second muscle wire can be used to retract the plunger to the second position. Further information on the details of retracting and extending operations with the use of the muscle wire may be found in U.S. Pat. No. 10,228,731 which is incorporated herein by reference in its entirety. In another embodiment, a solenoid may be used to move the plunger from the first position to the second position, or vice-versa.

The sensor 356 may include a hardware circuit that detects and responds to physical pressure, physical orientation, motion, position, heat, light, or the like. For example, the sensor 356 is a pressure sensor that receives a certain amount of compressive force from the sensor reference post 336. In this example, the sensor 356 may act as a switch and sends a sensor signal to the security controller 310 and/or the BIOS 142 when the compressive force is below a threshold as may be configured in the security controller 310 or the BIOS 142. The received sensor signal may be used by the security controller 310 as a basis for deleting stored security data such as public keys and private keys that are used to cryptographically bind the modular chassis lock assembly 195 to the EC and/or the BIOS. In another instance, when the system is powered OFF, the sensor signal may trigger a BIOS interrupt and the BIOS 142 may detect this possible tampering when the system is powered ON. In this another instance, the BIOS may require the user to re-enter user credentials to set aside the BIOS interrupt. In another example, the sensor 356 detects physical orientation of the sensor reference post 336. In this other example, the sensor signal may trigger the BIOS interrupt when the physical orientation of the sensor reference post 336 exceeds the limit as configured by the security controller 310. The BIOS interrupt may include the signal that indicates possible tampering of the chassis lock assembly 195. In these examples, the sensor reference post 336 may include a structure that is paired with corresponding detection function of the sensor 356.

The security controller 310 may include hardware circuit that is configured to control the operation of the plunger 350 and the sensor 356. The security controller 310 may include a printed circuit board structure including the sensor 356, the plunger housing 354 with the plunger 350, the muscle wire 352, and an internal data storage that stores the private key that can be used to verify an entered user credential. The security controller 310 may receive instructions from a program executing in the information handling system to initiate expanding or retracting operation of the plunger 350. The received instructions may include control signals from the BIOS 142 and/or the EC. For example, the BIOS 142 receives a user credential to unlatch the plunger 350. In this example, the BIOS 142 wraps the received user credential with the public key and sends the wrapped user credential to the security controller 310 for verification. Upon verification by the security controller 310 with the use of the private key, the security controller may disable the sensor 356 or it may not process any sensor signals received from the sensor. Furthermore, the security controller 310 may send the verification notification to the BIOS 142 and the security controller facilitates retraction of the plunger 350 to the second position in preparation for system shutdown if necessary. With the system shutdown and the plunger 350 in the second position, the motherboard 305 can be safely detached from the bottom chassis 245.

In a case where the public key and the private key are non existent at the security controller data storage, the BIOS 142 may request from the security controller 310 to create this pair. The public and private keys may not be existent when the security controller is not detected by the BIOS 142 or the BIOS figures out that there is a need to create a new pair of public and private keys. In this case, the security controller 310 creates the new pair of public and private keys and sends back the created public key to the BIOS 142 for storing. The BIOS 142 may use the public key to wrap the user credential and sends the wrapped user credential for verification by the security controller 310.

In a case where the BIOS 142 is requesting the security controller 310 to create the new pair of public and private keys and that the private key already exists at the security controller data storage, the security controller may detect a mismatch in the configuration of the BIOS and the chassis lock assembly 195. In this regard, the BIOS interrupt can be generated and the BIOS 142 may inform the user of the unlocking failure when the system is powered ON. In response to the BIOS interrupt, the BIOS 142 may implement inspection and following of policy actions. The policy actions may include preconfigured precautions in case of security breach or other unauthorized activity in the information handling system. The preconfigured precautions may include locking of the information handling system element, activating of the sensor signal, etc.

In a case where the BIOS 142 and/or the security controller 310 receives the sensor signal that may indicate possible chassis lock assembly tampering prior to the verification of the user credential, the BIOS and/or the security controller may delete the private key to prevent access to the motherboard 305 or access to the element that is coupled by the chassis lock assembly 195 to the bottom chassis 245 or another element. For example, prior to verification of the user credential, the sensor 356 detects changes in the physical orientation of the reference post 336. In this example, the BIOS 142 and/or the security controller 310 may delete the private key and other data to provide security to contents of the motherboard 305. In other cases, the BIOS 142 and/or the security controller 310 may utilize different thresholds to further increase security for unlatching the chassis 195. For example the threshold includes a maximum number of attempts to unlatch the chassis 195. In another example, the threshold may require additional user credentials such as fingerprint, facial features, and the like.

The particular embodiment shown in FIG. 3 utilizes a single chassis lock assembly 195 for purposes of illustration and other embodiments may require multiple chassis lock assemblies. For example, the removable element includes an expansion card as a daughtercard that can be attached to the motherboard 305. In this example, a second chassis lock assembly may be integrated to the daughtercard and the integrated second chassis lock assembly is used to prevent unauthorized removal of the daughtercard from the motherboard 305. In this example, the second chassis lock assembly can be operated and controlled separately from the first chassis lock assembly 195. The operation of the second chassis lock assembly is similar to the described operation of the chassis lock assembly 195.

Figure 4:
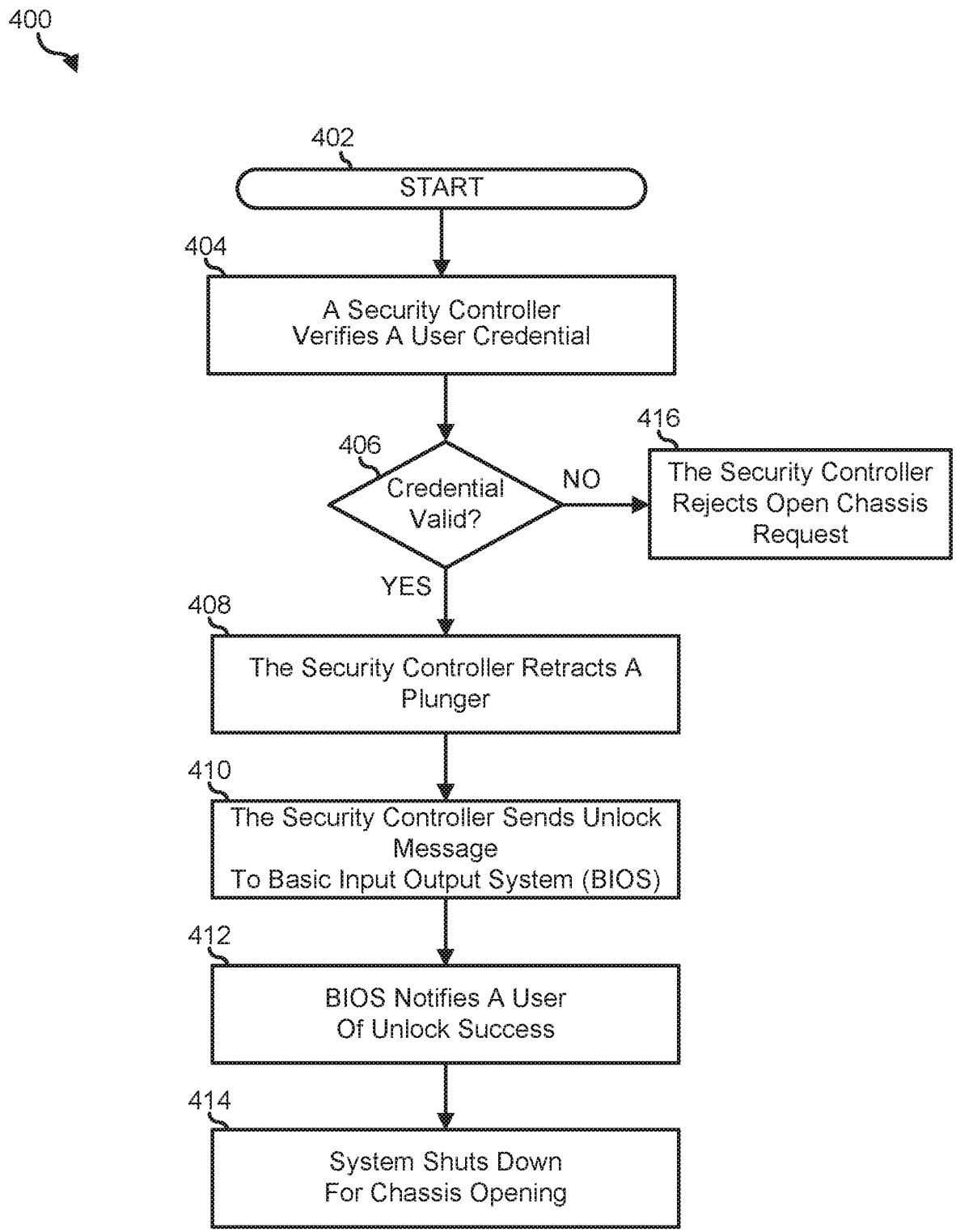
FIG. 4 is a flow chart showing a process of unlatching the chassis lock assembly from the chassis of the portable information handling system, according to an embodiment of the present disclosure.

FIG. 4 shows a method of disengaging the chassis lock assembly 195 from the hook 334 with the information handling system powered ON and the plunger 350 extended in the first position, starting at block 402. At block 404, the security controller 310 verifies entered user credentials. For example and at a BIOS setup menu, the user enters credentials to unlatch the plunger 350 from the hook. 334. The BIOS 142 receives and wraps the entered credentials with the public key, and the security controller 310 may decrypt the wrapped credentials using the private key. At block 406, the security controller 310 determines whether the decrypted credentials are valid. In response to a verified user credential and at block 408, the security controller 310 retracts the plunger 350 to disengage from the short side 335 of the hook 334. At block 410, the security controller 310 sends an unlocking message update to the BIOS 142. At block 412, the BIOS 142 may notify the user of complete disengagement by the plunger 350 from the hook 334. At block 414, the information handling system shuts down in preparation for the chassis opening. The chassis opening, for example, includes the disengagement by the plunger 350 in addition to removal of other fasteners such as screws or clips and the disabling of the sensor 356. At block 416 and in case of unverified user credentials, the security controller 310 may reject user request to open the chassis.

Figure 5:
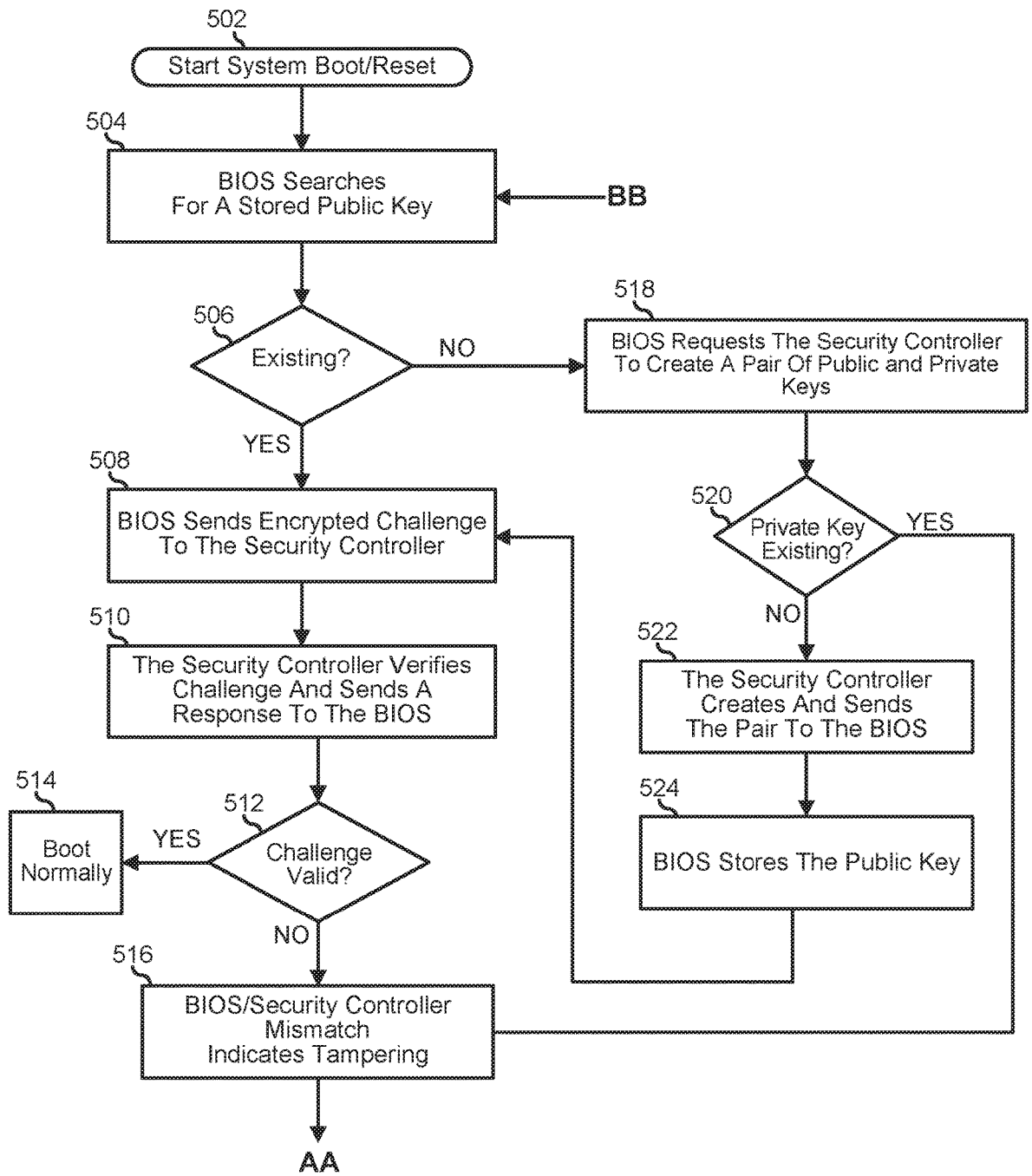
FIGS. 5-6 are flow charts showing methods of cryptographic exchanges between a basic input output system (BIOS) and the chassis lock assembly, according to an embodiment of the present disclosure.
Figure 6:
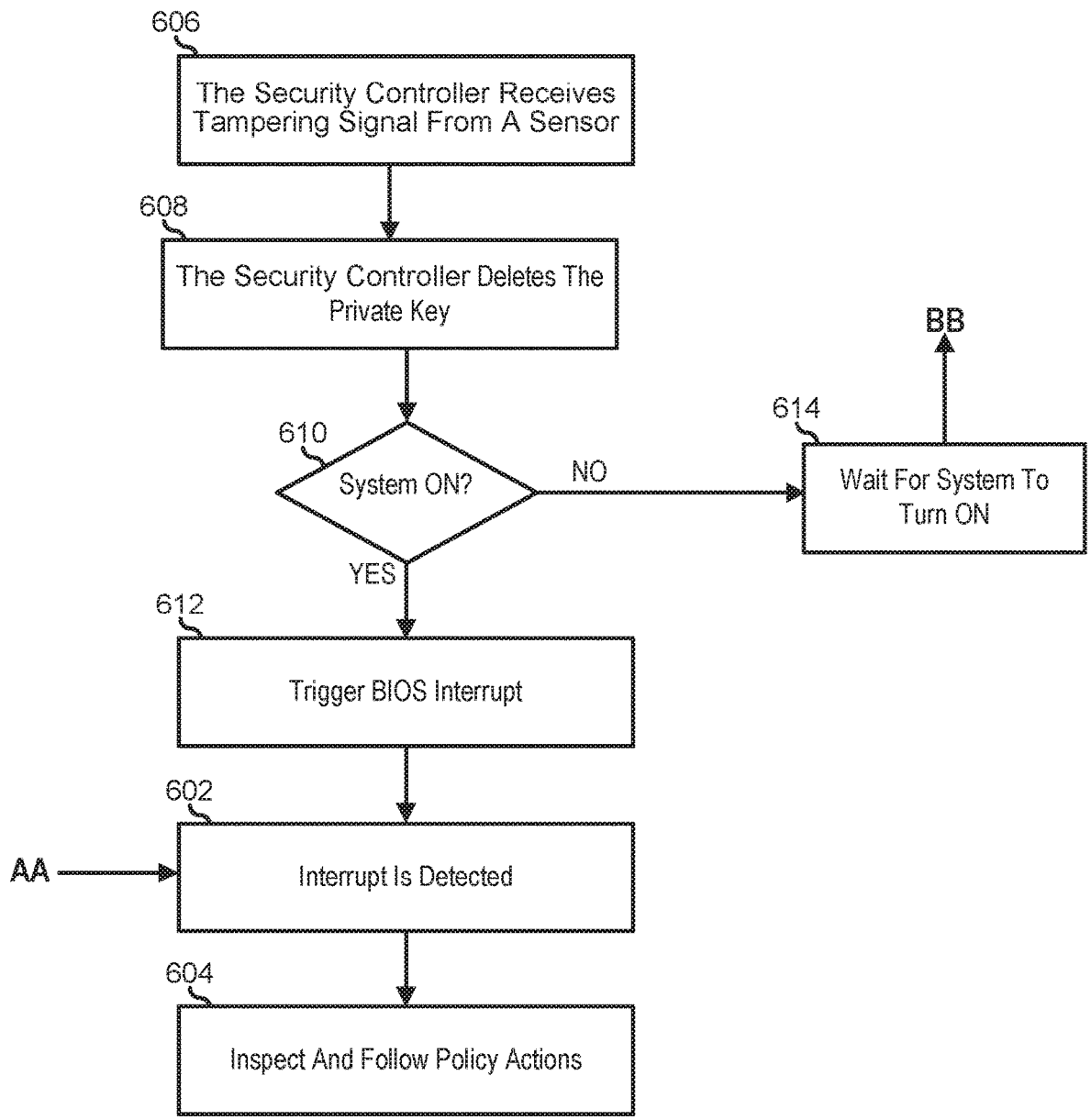

FIGS. 5 and 6 show a method of tampering detection with the information handling system initially powered OFF and the plunger 350 extended towards the short side 335 of the hook 334. At block 502, a system boot or a reset is initiated. At block 504, a BIOS looks for a stored public key in the memory. At block 506, the BIOS determines whether the public key already exists. In a case where the public key already exists, then at block 508, the BIOS 142 creates a nonce, encrypt the nonce with the public key, and sends a challenge to the security controller 310. At block 510, the security controller 310 verifies the encrypted nonce, and the security controller sends a response to the BIOS 142. In response to a verified challenge from the BIOS 142 at block 512, the information handling system may boot normally at block 514. Otherwise and at block 516, an unverified challenge may indicate a mismatch between the public key used by the BIOS 142 and the private key utilized by the security controller 310. The mismatch, for example, may indicate tampering of the chassis lock assembly 195. An output AA of the block 516 is processed next at block 602 of FIG. 6.

In a case where the public key is determined to be non existent at block 506, then at block 518, the BIOS 142 may request the security controller 310 to create a pair of public key and private key that can be used to unlatch the plunger 350 from the hook 334. In creating the pair, the security controller 310 is configured to determine first at block 520 if the private key already exists at the security controller data storage. If the data storage does not include the private key for the creation of the requested pair, then at block 522, the security controller 310 creates the pair of public key and private key and sends the created pair to the BIOS 142. At block 524, the BIOS 142 stores the public key and the process goes back to the block 508 where the BIOS wraps the user credential with the public key before sending the challenge to the security controller 310. However in a case where the private key is determined to already exist at block 520, then at block 516, the mismatch between the BIOS and the security controller may trigger an interrupt.

Referring to FIG. 6 and at block 602, the interrupt is detected. At block 604, the BIOS 142 may perform an inspection and implementation of policy actions. For example, the policy action includes notifying the user of the detected tampering, accepting another credential from the user, and the like.

In a case where the sensor 356 detects possible tampering, then at block 606, the security controller 310 receives a sensor signal that may indicate possible physical removal of the element including the chassis 195. At block 608, the security controller 310 may delete the private keys stored at the data storage of the security controller. The BIOS 142 may also delete the stored public keys in the memory. In a case where the information handling system is determined to have been powered ON at block 610, then the security controller 310 may trigger the BIOS interrupt. Otherwise and when the information handling system is determined to be at OFF state at block 610, then at block 614, the security controller 310 waits for the system to be powered ON and an output BB of the block 614 is processed next at block 504 of FIG. 5.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a chassis;
   a removable element; and
   a chassis lock assembly that couples the removable element to the chassis, the chassis lock assembly including:
      a sensor configured to detect when the removable element is removed from the chassis prior to verification of a user credential;
      a plunger that latches to the chassis at a first position; and
      a security controller configured to verify the user credential, wherein the security controller disables the sensor and facilitates movement of the plunger from the first position to a second position in response to a verified user credential.

2. The information handling system of claim 1, wherein the chassis includes a chassis hook having a vertically flipped "L" shaped structure, wherein the plunger is disposed adjacent to a short side of the "L" shaped structure at the first position.

3. The information handling system of claim 2, wherein the plunger moves from the first position to the second position to disengage from the chassis hook.

4. The information handling system of claim 1, wherein the chassis lock assembly further including a muscle wire that is coupled to the plunger, wherein the security controller sends an electrical signal to the muscle wire in response to the verified user credential, the electrical signal facilitates the movement of the plunger from the first position to the second position.

5. The information handling system of claim 1, wherein the security controller includes a data storage that stores a private key to decrypt the user credential that is wrapped by a basis input output system (BIOS) with a public key.

6. The information handling system of claim 5, wherein the security controller sends an unlocking notification to the BIOS upon the verification of the user credential, wherein the BIOS sends the unlocking notification to a user.

7. The information handling system of claim 5, wherein the security controller creates a pair of the public key and the private key in response to a request from the BIOS, wherein the pair is used to cryptographically bind the chassis lock assembly to the BIOS.

8. The information handling system of claim 1, wherein the sensor includes a pressure sensor.

9. The information handling system of claim 8, wherein the security controller is configured to delete a stored private key in response to a triggering of an interrupt by the sensor.

10. The information handling system of claim 1, wherein the security controller utilizes a threshold in the verification of the user credential.

11. A lock for coupling an element of a chassis of an information handling system, the lock comprising:
a sensor configured to detect removal of the element from the chassis prior to verification of a user credential;
a plunger that engages the chassis at a first position;
a muscle wire connected to the plunger; and
a security controller configured to verify the user credential, to disable the sensor, and to cause the muscle wire to move the plunger from the first position to a second position in response to the verified user credential.

12. The lock of claim 11, wherein the plunger latches to a chassis hook of the chassis at the first position, the chassis hook having a vertically flipped "L" shaped structure, wherein the plunger is disposed adjacent to a short side of the "L" shaped structure at the first position.

13. The lock of claim 11, wherein the sensor is configured to trigger an interrupt in response to a detected removal of the element from the chassis prior to the verification of the user credential, wherein the interrupt indicates an unauthorized removal of the element from the chassis.

14. The lock of claim 11, wherein the security controller includes a data storage that stores a private key to decrypt the user credential that is wrapped by a basic input output system (BIOS) with a public key.

15. The lock of claim 14, wherein the security controller sends an unlocking notification to the BIOS upon the verification of the user credential, wherein the BIOS sends the unlocking notification to a user.

16. The lock of claim 14, wherein the security controller creates a pair of the public key and the private key that are used to cryptographically bind the chassis lock assembly to the BIOS.

17. The lock of claim 11, wherein the sensor includes a pressure sensor.

18. A method, comprising:
receiving, by a basic input output system (BIOS), a user credential; and
verifying, by a security controller, the user credential, wherein the security controller is configured to disable a sensor of a chassis lock assembly and to disengage a plunger of the chassis lock assembly from a chassis in response to a verified user credential, wherein the sensor is configured to detect when an element that is attached by the chassis lock assembly to the chassis is detached prior to the verification of the user credential.

19. The method of claim 18, wherein the receiving further including:
searching, by the BIOS, a stored public key;
wrapping the user credential with the public key; and
sending the wrapped user credential to the security controller for verification of the user credential.

20. The method of claim 19, wherein the security controller decrypts the wrapped user credential using a private key to verify the user credential, wherein the plunger moves from the first position to a second position in response to a verified user credential.

* * * * *